United States Patent [19]

Andersson

[11] 4,401,342

[45] Aug. 30, 1983

[54] DEVICE FOR ELIMINATING VIBRATIONS OF A DRIVER'S CHAIR

[76] Inventor: Karl-Gunnar Andersson, Postlåda 200, S-956 00 Överkalix, Sweden

[21] Appl. No.: 315,426

[22] Filed: Oct. 27, 1981

[30] Foreign Application Priority Data

Nov. 3, 1980 [SE] Sweden .............................. 8007701

[51] Int. Cl.³ .............................................. B60R 21/10
[52] U.S. Cl. .................................... 297/216; 248/562
[58] Field of Search ....................... 248/562, 564, 636; 297/303, 302, 346, 309, 289, 276, 216

[56] References Cited

U.S. PATENT DOCUMENTS

| | | | |
|---|---|---|---|
| 1,599,555 | 9/1926 | Coe .................................. | 248/581 X |
| 1,774,555 | 9/1930 | Horsley et al. ..................... | 248/581 |
| 2,637,368 | 5/1953 | Cotton .............................. | 297/216 |
| 2,707,986 | 5/1955 | Johnson ............................ | 248/583 |
| 3,099,261 | 7/1963 | Doss et al. ................... | 297/216 UX |
| 3,986,748 | 10/1976 | Magnuson ......................... | 296/65 R |
| 4,128,217 | 12/1978 | Mazelsky ........................ | 297/216 X |

Primary Examiner—J. Franklin Foss
Attorney, Agent, or Firm—Burns, Doane, Swecker & Mathis

[57] ABSTRACT

This invention relates to a device for eliminating vibrations of a driver's chair.

The device according to the invention is characterized in that it comprises a carrying frame, a cradle located within the carrying frame and carrying the driver's chair. The cradle is provided with a number of rotatably supported pulleys and is carried relative to the carrying frame in that the pulleys contact at least two wires or ropes supported by the carrying frame. One end of the wires is secured resiliently in the carrying frame, and the wires extend transversely to the driving direction for the vehicle, in which the device is to be mounted. A damping arrangement is also provided between the cradle and carrying frame.

7 Claims, 5 Drawing Figures

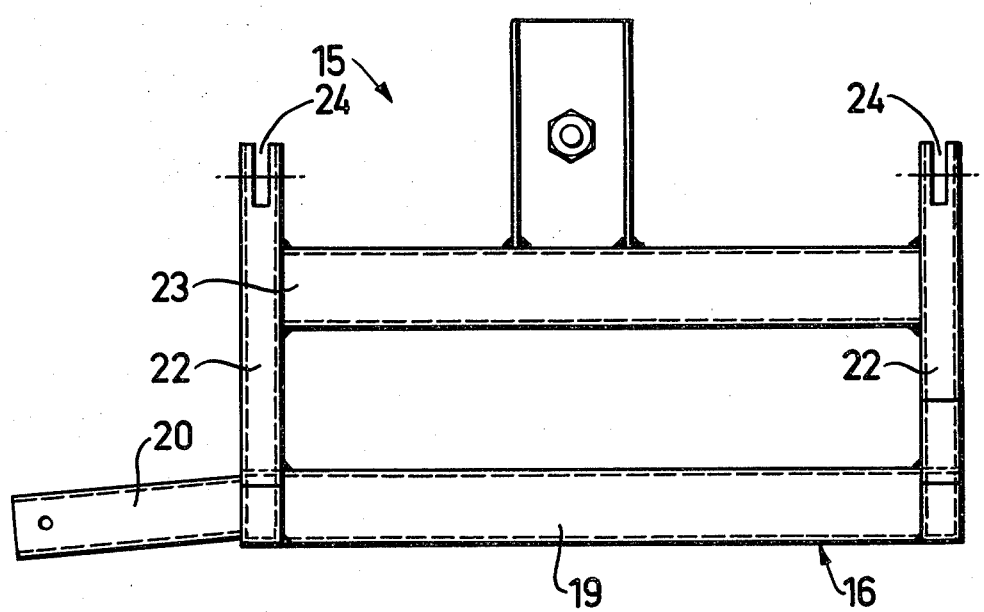
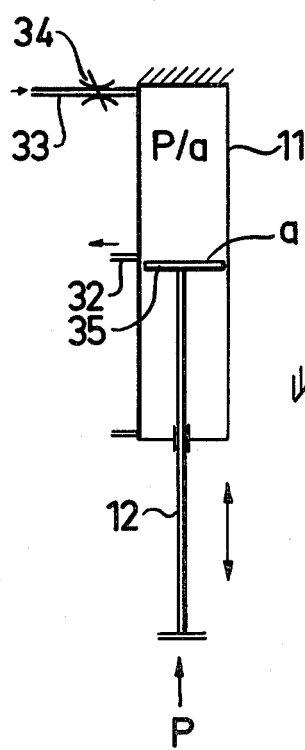
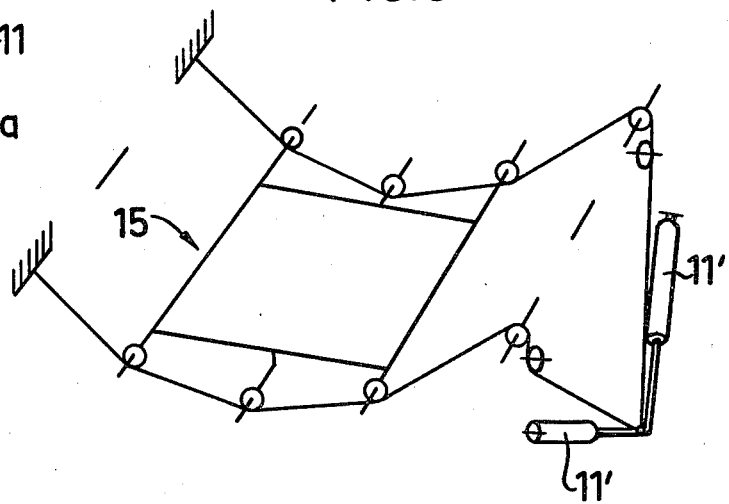

ical equipment where vibrations and motions of the vehicle are scanned and whereafter the driver's chair is compensated for the type of agitation by means of control equipment.

DEVICE FOR ELIMINATING VIBRATIONS OF A DRIVER'S CHAIR

BACKGROUND AND SUMMARY OF THE PRESENT INVENTION

This invention relates to a device for eliminating vibrations of a driver's chair.

The known devices of the aforesaid kind usually are so-called active systems. They operate with relatively complicated electronic equipment where vibrations and motions of the vehicle are scanned and whereafter the driver's chair is compensated for the type of agitation by means of control equipment.

These known devices are very expensive and, moreover, not very reliable in operation.

A further problem with known devices of the aforesaid kind is that the feet of the driver rest on the bottom plate in the cab. When this bottom plate is not devibrated in any way, the vibrations from it will be transferred to the driver's feet and even propagate upward along his legs.

The present invention has the object to produce a device of the kind mentioned above, by which the vibrations are eliminated by a so-called passive system. The device according to the invention renders possible so-called all-body damping.

BRIEF DESCRIPTION OF THE DRAWINGS

A preferred embodiment of the invention will be described in greater detail in the following, with reference to the accompanying drawings, in which FIG. 3 is a lateral view of the cradle comprised in the device according to the invention, FIG. 4 is a schematic layout of the level control system in the device according to the invention, FIG. 5 is a basic layout of the suspension of the cradle comprised in the device according to the invention.

DETAILED DESCRIPTION OF THE PREFERRED EMBODIMENT

Figure 2:
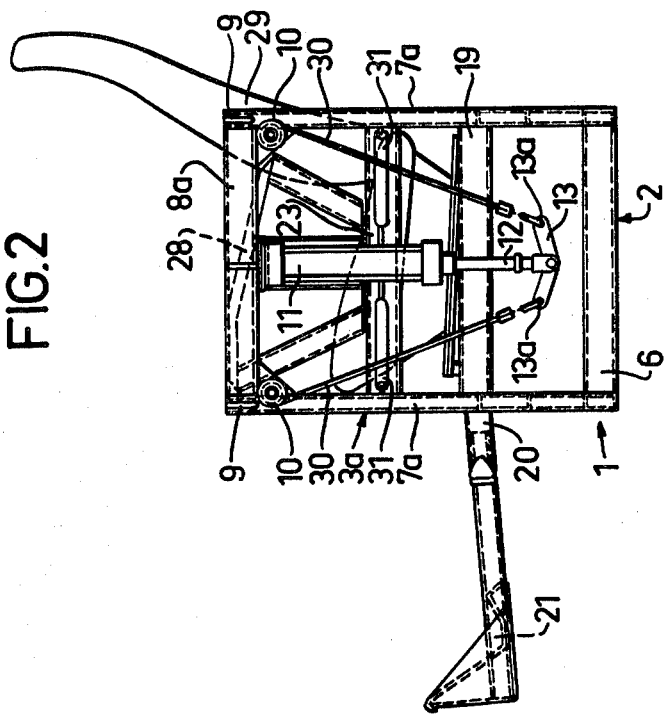
FIG. 2 is a lateral view of the device according to the invention.
Figure 1:
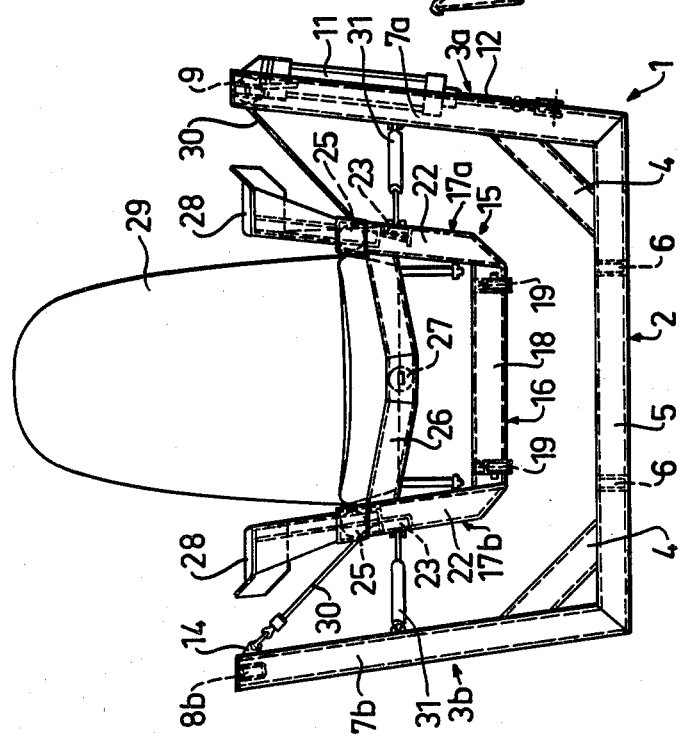
FIG. 1 is a front view of the device according to the invention.

The driver's chair shown in FIGS. 1 and 2 comprises a carrying frame 1, which consists of a bottom member 2 and two side members 3a and 3b. The bottom member 2 and the side mambers 3a and 3b are connected by means of inclined stay members 4.

The bottom member 2 consists of two box girders 5 extending transversely to the driving direction of the vehicle. The box girders are connected by two box girders 6 extending in the driving direction of the vehicle and offset inward relative to the ends of the box girders 5.

Each side member 3a,3b consists of two upright box girders 7a and, respectively, 7b, which are inclined outward relative to the centre of the driver's chair. Each pair of box girders 7a and, respectively, 7b are connected at their upper ends by a horizontal box girder 8a and, respectively, 8b.

One pair of upright box girders 7a (the right-hand one in FIG. 1) are provided at their upper ends with a slit, which extends transversely to the driving direction of the vehicle, and in which a pulley 9 is supported rotatably. Additional pulleys 10 are located immediately below the first pulleys 9, but the second pair of pulleys 10 are located in a plane prrpendicular to the first pulleys 9.

At the right-hand side member 3a in FIG. 1, a pressure medium cylinder 11 is attached, which is located in the plane of the side member 3a, and the piston rod 12 of which is directed downward.

A yoke 13 is attached hingedly to the free end of the piston rod 12 and is provided at its ends with openings 13a for receiving wires or ropes.

On the horizontal box girder 8b of the second pair of upright box girders 7b two fastening eyes 14 are attached.

The driver's chair shown in FIGS. 1 and 2 also comprises a cradle 15, which is located between the side members 3a,3b and consists of a bottom member 16 and two side members 17a,17b. As appears from FIGS. 1–3, the bottom member 16 comprises two box girders 18, which extend transversely to the driving direction of the vehicle, and two box girders 19, which extend in the driving direction of the vehicle and are slightly drawn-in from the ends of the box girders 18. The box girders 19 are extended forward in the driving direction of the vehicle, and the extended portions 20 carry at their ends a foot support 21.

The side members 17a and 17b comprise two upright box girders 22, which are inclined outward in relation to the centre of the driver's chair. The two box girders in the same side member are connected by a horizontal box girder 23 slightly above the centre of the upright box girders 22. In the region of the upper end of the upright box girders a slit 24 is located (see FIG. 3), in which pulleys 25 are supported rotatably. Said pulleys 25 are located in a plane transverse to the driving driving direction of the vehicle.

The two forward and, respectively, rearward box girders 22 are interconnected by means of downwardly curved box girders 26, in the central portion of which a pulley 27 is mounted rotatably in the same plane as the pulleys 25.

On the side members 17a and 17b arm supports 28 are attached which are intended to receive control equipment (not shown) for the vehicle and its tools.

On the bottom member 16 of the cradle 15 a driver's chair 29 is mounted.

Two wires 30 carry the cradle 15 relative to the carrying frame 11. The wires 30 are secured at one end in the fastening eyes 14 on the horizontal box girder 8b. Thereafter the wires 30 pass below the pulleys 25 in the upright box girders 22 and also below the pulleys 27 in the downwardly curved box girders 26. From the right-hand pulleys 25 in FIG. 1 the wires 30 extend over the pulleys 9 in the upright box girders 7a in FIG. 1. The wires 30, besides, are deflected over the pulleys 10 before they are secured in the holes 13a in the yoke 13.

By this suspension of the cradle 15 with the chair 29, the cradle 15 can be moved in relation to the carrying frame 1 in the plane of the paper in FIG. 1. The pulleys 25 and 26 thereby roll on the wires 30 during said movement.

It is understood immediately that the cradle 15 with the chair 29 always tends to assume a horizontal position relative to the carrying frame 1 in the plane of the paper in FIG. 1.

For effecting this movement of the cradle 15 on the wires 30 to occur as smoothly as possible, a number of shock absorbers 31 are arranged between the cradle 15 and the carrying frame 1. The shock absorbers 31 are at one end hingedly attached to the horizontal box girders 23, while their other end is hingedly attached to the upright box girders 7a and 7b of the side members 3a and 3b.

All of the schock absorbers 31 are directed obliquely inward to the central portion of the driver's place 1.

The shock absorbers 31, in addition to braking the movement of the cradle 15 along the wires 30, also dampen the rocking motion at acceleration and retardation possibly performed by the cradle 15 in relation to the carrying frame 1 perpendicularly to the plane of the paper in FIG. 1.

Due to the attachment of one end of the wires 30 to a resilient means (the pressure medium cylinder 11), shocks and vibrations in the vertical plane are not transferred from the carrying frame 1 to the chair 29.

In the illustrated embodiment the resilient means is a pressure medium cylinder, but also, for example, a spring can be imagined when some level control of the chair 29 is not desired.

The suspension of the chair 29 described above in relation to the carrying frame 1 does not permit any horizontal adjustment of the chair in the plane of the paper in FIG. 2. Empiric tests, however, have shown that this is not necessary.

In FIG. 4 the principle of the level control for the chair 29 is shown.

In the wall of the cylinder 11 a hole 32 is located. A supply line 33 for pressure medium, normally hydraulic oil, is provided at the upper end of the cylinder 11 in FIG. 4. In the supply line 33 a throttle valve 34 is located.

The arrangement according to FIG. 4 operates as follows. The piston rod 12 is actuated by an upwardly directed force P, the size of which varies with the weight of the person sitting on the chair 29. The force P is balanced by a pressure P/a, which acts on the upper surface of the piston 35, which surface has an area a. The piston 35 now tends to assume a position of equilibrium where the amount of pressure medium supplied per time unit through the line 33 is equal to the amount of peessure medium removed per time unit through the hole 32. This position of equilibrium is achieved when the piston 35 covers a portion of the hole 32.

When now the upwardly directed force P on the piston rod 12 increases in that somebody gets seated on the chair 29, the piston rod 12 and piston 35 are moved upward until the pressure above the piston 35 has increased so that equilibrium again is achieved. Thereby, however, the piston has been moved above the hole 32, which implies that no pressure medium is removed from the space above the piston 35, but only supply takes place through the throttled line 33. The pressure P/a then increases, whereby the piston 35 is moved downward until the afore-described position of equilibrium is achieved.

Due to the arrangement shown in FIG. 4, thus, the chair 29 always will be on the same level, irrespective of the weight of the person sitting on the chair 29.

The invention is not restricted to the embodiment described above.

It can be imagined, for example, that the cylinder 11 is replaced by two inclined hingedly attached cylinders 11', which is shown in the basic layout for the suspension of the cradle 15 according to FIG. 5. Hereby the progressivity is reduced. since the foot support is connected to the cradle all-body damping is obtained, i.e. the driver need not rest with the feet on the vibrating support.

The invention can be varied freely also in other respects within the scope of the attached claims.

What I claim is:

1. A device for eliminating vibrations of a driver's chair, comprising a carrying frame, a cradle provided in the carrying frame and carrying the driver's chair, the cradle including a plurality of rotatably mounted pulleys and being supported relative to the carrying frame such that the pulleys contact at least two wires or ropes supported by the carrying frame, one end of said wires being secured resiliently in the carrying frame, the wires extending transversely to the driving direction of the vehicle in which the device is adapted to be mounted such that inclinations at least in the transverse direction may be compensated, and damping means extending between the carrying frame and a portion of the cradle near a central portion of the driver's chair.

2. The device as defined in claim 1, wherein the carrying frame comprises two side members, another end of the wires being non-resiliently attached to one side member, while the one end of the wires is attached to a piston rod of a pressure medium cylinder, said pressure medium cylinder being attached on the other side member with the piston rod directed downward.

3. The device as defined in claim 1, wherein the damping means comprises shock absorbers, which are directed inward to the cradle at the central portion of the driver's chair.

4. The device as defined in claim 1, wherein three pulleys of the cradle are in contact with each wire.

5. The device as defined in claim 2, wherein on the side member of the carrying frame where the wires are secured resiliently, each wire runs over two pulleys attached to said member, the planes of rotation of the two pulleys being perpendicular to each other.

6. The device as defined in claim 1, wherein the resiliently secured ends of the wires are connected to a spring.

7. The device as defined in claim 2, wherein the pressure medium cylinder is provided with a supply line including a throttle valve, and a hole being located in the cylinder wall at about half the cylinder height.

* * * * *